(12) United States Patent
Gloger

(10) Patent No.: US 9,238,435 B2
(45) Date of Patent: Jan. 19, 2016

(54) DEVICE FOR MONITORING AN ENVIRONMENT OF A VEHICLE WITH PAIRS OF WAFER LEVEL CAMERAS USING DIFFERENT BASE DISTANCES

(71) Applicant: Daimler AG, Stuttgart (DE)

(72) Inventor: Joachim Gloger, Bibertal (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/480,741

(22) Filed: Sep. 9, 2014

(65) Prior Publication Data

US 2015/0015715 A1 Jan. 15, 2015

Related U.S. Application Data

(62) Division of application No. 13/130,074, filed as application No. PCT/EP2009/008234 on Nov. 19, 2009, now abandoned.

(30) Foreign Application Priority Data

Dec. 12, 2008 (DE) .......................... 10 2008 061 760

(51) Int. Cl.
| | |
|---|---|
| *H04N 7/18* | (2006.01) |
| *H04N 13/00* | (2006.01) |
| *H04N 13/02* | (2006.01) |
| *B60R 1/00* | (2006.01) |
| *H04N 5/232* | (2006.01) |
| *B60R 11/04* | (2006.01) |

(52) U.S. Cl.
CPC . *B60R 1/00* (2013.01); *B60R 11/04* (2013.01); *H04N 5/23238* (2013.01); *H04N 7/181* (2013.01); *H04N 13/0242* (2013.01); *B60R 2300/105* (2013.01); *B60R 2300/30* (2013.01); *B60R 2300/303* (2013.01); *B60R 2300/607* (2013.01); *B60R 2300/806* (2013.01)

(58) Field of Classification Search
CPC .... B60R 11/04; B60R 1/00; B60R 2300/105; B60R 2300/303; B60R 2300/607; B60R 2300/806; H04N 13/0242; H04N 5/23238
USPC ......................................................... 348/148
See application file for complete search history.

(56) References Cited

U.S. PATENT DOCUMENTS

| | | | |
|---|---|---|---|
| 6,535,242 B1* | 3/2003 | Strumolo | B60R 11/04 348/148 |
| 8,842,176 B2* | 9/2014 | Schofield | B60R 1/00 348/113 |
| 2005/0243171 A1* | 11/2005 | Ross, Sr. | B60R 25/302 348/148 |
| 2008/0049100 A1* | 2/2008 | Lipton | H04N 13/0011 348/43 |
| 2008/0073734 A1* | 3/2008 | Kong | H01L 27/14618 257/432 |
| 2008/0199069 A1* | 8/2008 | Schick | G01S 11/12 382/154 |
| 2008/0231710 A1* | 9/2008 | Asari | H04N 17/002 348/187 |

* cited by examiner

*Primary Examiner* — Jessica M Prince
(74) *Attorney, Agent, or Firm* — Patent Central LLC; Stephan A. Pendorf

(57) ABSTRACT

The invention relates to a device for monitoring an environment of a vehicle, wherein the environment is captured by means of a plurality of image capturing units, the capture ranges (2) thereof at least partially overlapping each other and forming an overlap range (3), wherein an overall image is generated from the individual images captured by means of the image capturing units by means of an image processing unit, said overall image showing the vehicle and the environment thereof from a bird's-eye view. According to the invention, the image capturing units are designed as wafer-level cameras (1).

5 Claims, 1 Drawing Sheet

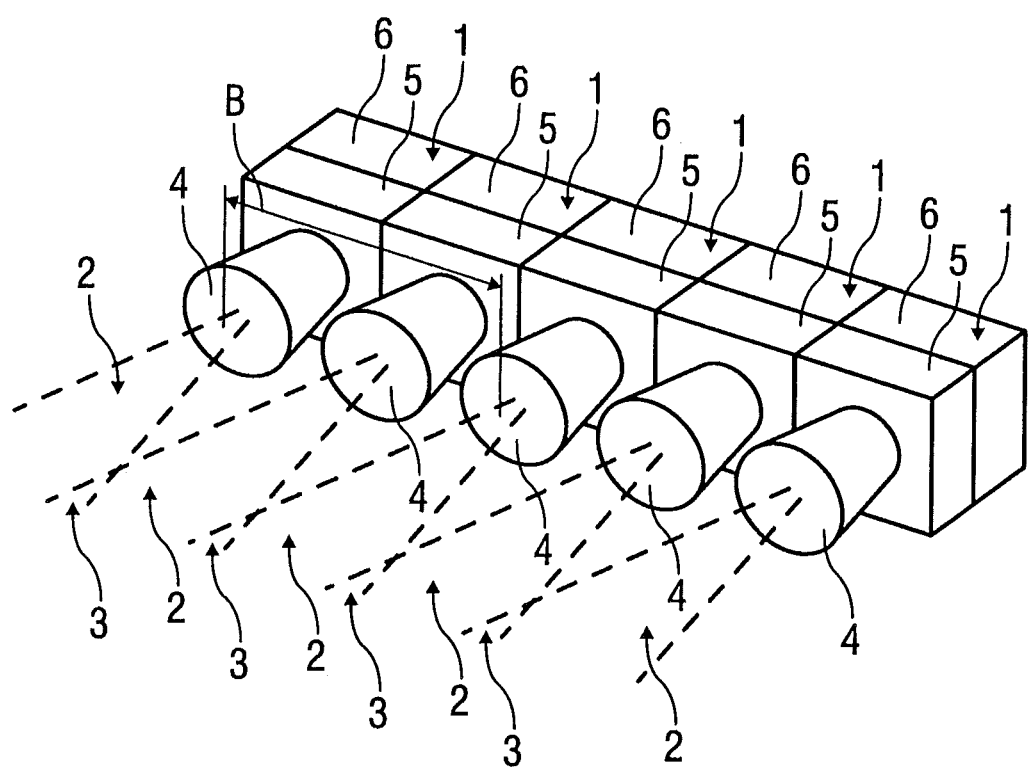

DEVICE FOR MONITORING AN ENVIRONMENT OF A VEHICLE WITH PAIRS OF WAFER LEVEL CAMERAS USING DIFFERENT BASE DISTANCES

The invention relates to a device for monitoring an environment of a vehicle according to the characteristics of the preamble of claim 1.

Utility vehicles for goods or people transport are often characterized by large vehicle dimensions and a low viewing clarity. Modern passenger motor vehicles often also have a low viewing clarity due to their outer design. From this, it results that particularly a maneuvering of these vehicles is very difficult for a driver. It is thus advantageous, to depict vehicles and their environment from a bird's-eye view on a screen, so that the vehicle and its entire environment are visible to the driver.

From the state of the art are known different methods and devices for such a monitoring and depiction of an environment of a vehicle, wherein particularly an image of the vehicle and the environment thereof is issued to a driver of the vehicle from a bird's eye view. A better panorama view is thereby created for the driver, which view serves him as an assistance function or support during the drive operation, for example when maneuvering the vehicle. Furthermore, accidents can be avoided, which often occur due to a bad panorama view, particularly with large vehicles and those whose view is limited.

From the state of the art is known a monitoring device for a vehicle, as described in DE 100 59 786 B4. A device for monitoring an environment that cannot be viewed directly and/or for the forward-looking monitoring of the vehicle lane comprises a camera arranged in the front and/or rear region of the vehicle, a signal processing device and a display device in the viewing field of the driver, Furthermore, the device has means for transferring the at least one camera into a protected resting position with non-use and into at least one defined operating position in use and means for the forward-looking monitoring of the drive lane, on which the wheels of the vehicle roll, wherein these means comprise at least one sensing device at the vehicle for sensing ground unevenness, and an evaluation unit, which converts the signals of the at least one sensing unit into display signals and/or control commands for vehicle assemblies that can be controlled actively. The at least one sensing device of the means for the forward-looking monitoring of the drive lane is formed by at least one camera present for monitoring the environment of a vehicle that cannot be viewed directly, wherein the means cooperating with the at least one camera for transferring the at least one camera into a protected resting position in non-use and into at least one defined operating position in use have a pivot device for the vertical and/or horizontal pivoting of the at least one camera.

From EP 1 145 905 A2 is known a camera with a viewing field control for the dead angle monitoring with motor vehicles. A prism for the reflection of incident light from a left and right image capturing device is arranged at a vehicle. An alignment of an image capturing unit can be pivoted vertically and obliquely to a horizontal plane, so that objects above or below this horizontal plane can be captured with the image capturing unit.

A device for monitoring an environment of a movable body is known from DE 601 01 440 T2, wherein the movable body preferably transports persons or freight, that is, is a vehicle in particular. The device comprises an image processor, which can be operated in such a manner that it transforms image data captured by at least one image capturing unit to a display of the mobile body and its environment in a bird's eye view in such a manner that a display unit displays an image of the body and its environment in the bird's eye view. The displayed image can thereby also be determined by means of a combination of a first perspective image of a first image capturing unit and a second perspective image of a second image capturing unit. For the transformation of the image data, a look-up table, also known as look-up table or conversion table, is used.

US 2008 043 113 A1 further discloses a device and a method, by means of which individual images from a front camera and a lateral camera, which are arranged at a front and left side of the vehicle, are converted to overall images, which show the vehicle and its environment from a bird's eye view. For a capturing of the environment of the vehicle as completely as possible, the capturing ranges of the cameras overlap, wherein the overall image shown in a bird's eye view is formed by means of a combination of the individual images. The conversion of the individual images to the overall image takes place by means of data of a conversion table.

Furthermore, a so-called WLC technology (wafer-level camera) is known from the state of the art. With the WLC technology, the optical lenses are placed directly on a wafer. The production of the wafer-level cameras functions similar to applying circuits onto a wafer. Thereby, thousands of optical lenses are simultaneously applied onto a wafer, aligned thereafter and adhered thereto. By means of a so-called wafer stack technology, the necessary but cost-intensive individual assembly and alignment of the lenses with the conventional production method is omitted. The individual wafer-level cameras are finally cut out from the wafer and placed on a sensor module. The big advantage of this technique are the low costs of production. Furthermore, the wafer-level cameras with a size of 2.5 millimeters are only approximately half the size of the smallest conventional camera modules.

The invention is based on the object to give an improved device for monitoring an environment of a vehicle.

This object is solved according to the invention by a device with the characteristics of claim 1.

Preferred designs and further developments of the invention are given in the dependent claims.

With a device for monitoring an environment of a vehicle according to the invention, the environment is captured by means of a plurality of image capturing units, the capture ranges thereof overlapping at least partially and forming an overlap range, wherein an overall image is generated from the individual images captured by means of the image capturing units by means of an image processing unit, which overall image shows the vehicle and the environment thereof from a bird's-eye view. The image capturing units are formed as wafer-level cameras according to the invention.

The wafer-level cameras advantageously cause low production costs. The installation space requirement of the camera is so low that several of these wafer-level cameras can be arranged adjacent to each other in the form of a line.

By means of a large number of installed wafer-level cameras, a complete environment of the vehicle can conveniently be captured without requiring complicated pivot mechanisms for an individual camera.

An improved panorama view is thereby created for the driver, which serves him as an assistance function or support during the drive operation, for example when maneuvering the vehicle. Furthermore, accidents can be avoided, which often occur due to a bad panorama view, particularly with large vehicles and whose view is limited.

An embodiment of the invention is explained in more detail in the following by means of a drawing.

The only FIG. 1 thereby shows a schematic depiction of a line of several wafer-level cameras according to the invention.

Several, particularly 10 or more wafer-level cameras 1 are arranged in a line and integrated at the sides of a vehicle body, not shown in detail.

By means of the large number of wafer-level cameras 1, an environment of the vehicle, not shown in detail, is captured completely. Dead angles in the capture are avoided thereby.

The wafer-level cameras 1 are produced by means of a so-called WLC technology (wafer-level camera). With the WLC technology, the optical lenses 4 are placed directly onto a wafer 5. The production of the wafer-level camera 1 functions similar to with applying circuits onto the wafer 5. Thousands of optical lenses are thereby applied simultaneously onto a wafer 5, aligned thereafter and adhered thereto. By means of a so-called wafer stack technology, the necessary but cost-intensive individual assembly and alignment of the lenses 4 with the conventional production method is omitted. The individual wafer-level cameras 1 are finally cut out from the wafer and placed on a sensor module 6. The big advantage of this technique are the low costs of production. Furthermore, the wafer-level cameras with a size of 2.5 millimeters are only approximately half the size of the smallest conventional camera modules.

In order to reproduce the environment of the vehicle or at least critical regions of this environment, which are not in the direct viewing field of the motorist, thus in the so-called dead angle, as completely as possible, the wafer-level cameras 1 are arranged and aligned in such a manner that their respectively reproduced capture ranges 2 superpose partially, that is, partial regions of the reproduced environment of the vehicle are captured by several cameras and form an overlap range 3.

In order to in particular ease a maneuvering of the vehicle for the driver or to for example to enable an improved overview of objects next or behind the vehicle at traffic light crossings, an image processing unit, not shown in detail, generates an overall image from individual images captured by means of the wafer-level cameras 1, which overall image shows the vehicle and its environment from a bird's eye view. This overall image can preferably be issued to the driver of the vehicle on a screen.

The overall image is transferred to a display device, not shown in detail, which is arranged in the vehicle in viewing field of the driver. A display device of a navigation system or of a reversing assistance system can for example be used as such a display device.

In a further embodiment, a depicted image of the wafer-level cameras 1 can be cross-faded with markings on the display device, which represent dimensions of the vehicle, for example a width and additionally also a height of the vehicle, so that the driver can detect quickly and clearly, if his vehicle can for example pass between obstacles or below an obstacle. In this embodiment, the monitoring device comprises for example additionally an image processing unit, in order to position the markings correctly corresponding to a respectively depicted image section.

In a further development of the invention, not shown in detail, the vehicle is depicted in the drive direction on the display unit, wherein the driver of the vehicle can choose in a preferred manner, in which depiction the vehicle and its environment shall be shown to him.

In a design of the invention not shown in detail, one can switch over, depending on the drive situation, from the depiction of the vehicle and its environment from a bird's eye view, to a display from another viewing angle, for example an image of a reversing camera, so that the driver of the vehicle can evaluate the drive situation in a better manner.

In a preferred embodiment, a stereoscopy can be used. For this, the images of two wafer-level cameras 1 are recorded from a line of wafer-level cameras 1 and are transferred to the image processing unit.

With the stereoscopy, a distance between the two recording cameras, also called base width B, is important. This base width B is variable with a line of wafer-level cameras 1. The base width B can simply be varied by an actuation of different wafer-level cameras 1. Wafer-level cameras 1 lying far apart can for example record images with a large base width B. Analogously, wafer-level cameras 1 lying close to each other can record images with a small base width B.

This base width adjustment advantageously functions without an elaborate mechanics for adjusting a camera.

In a further advantageous embodiment, the wafer-level cameras 1 of a line are equipped with optical lenses 4 having different focal widths. Images with different focal widths can thereby be recorded by a simple switch-over between the different wafer-level cameras 1.

Due to the large data amount by the recorded images, it is convenient to arrange the image processing unit in the vehicle in the immediate spatial proximity to the wafer-level cameras 1, in order to keep the cable number and length low. Alternatively, a wireless data transfer between wafer-level cameras 1 and the image processing unit is also possible.

LIST OF REFERENCE NUMERALS

1 Wafer-level camera
2 Capture range
3 Overlap range
4 Optical lens
5 Wafer
6 Sensor module
B Base width

The invention claimed is:

1. A device for monitoring an environment of a vehicle, wherein the environment is captured by means of a plurality of image capturing units, the capture ranges (2) thereof at least partially overlapping each other and forming an overlap range (3), wherein an overall image is generated from the individual images captured by means of the image capturing units by means of an image processing unit, which overall image shows the vehicle and the environment thereof from a bird's-eye view,
wherein the image capturing units are wafer-level cameras (1),
wherein several wafer-level cameras (1) are arranged parallel adjacent to each other in the form of a line, and
wherein the image processing unit obtains a first stereo image from a first pair of wafer-level cameras separated by a first base distance and a second stereo image from a second pair of wafer-level cameras separated by a second base distance, wherein the first base distance is different from the second base distance, to obtain stereo images with different base widths.

2. The device according to claim 1, wherein the wafer-level cameras (1) are arranged at the sides of a vehicle body in an integrated manner.

3. The device according to claim 1, wherein two wafer-level cameras (1) of a line simultaneously record individual images and transfer the individual images recorded by each camera to the image processing unit.

4. The device according to claim 1, wherein a display device for depicting the overall image is provided.

5. The device according to claim 1, wherein the image processing unit is arranged in the immediate spatial proximity to the wafer level cameras (1) in the vehicle.

\* \* \* \* \*